United States Patent [19]

Boden et al.

[11] Patent Number: 5,391,692
[45] Date of Patent: Feb. 21, 1995

US005391692A

[54] METHOD FOR MAKING AROMATIC POLYCARBONATES

[75] Inventors: Eugene P. Boden, Scotia; Peter D. Phelps, Schenectady, both of N.Y.; David L. Ramsey, Mt. Vernon, Ind.; Paul D. Sybert; Larry I. Flowers, both of Evansville, Ind.; Roy R. Odle, Mt. Vernon, Ind.

[73] Assignee: General Electric Company, Schenectady, N.Y.

[21] Appl. No.: 190,395

[22] Filed: Feb. 2, 1994

Related U.S. Application Data

[63] Continuation-in-part of Ser. No. 66,382, May 24, 1993, abandoned.

[51] Int. Cl.6 .............................................. C08G 64/00
[52] U.S. Cl. .................................... 528/199; 528/196; 528/198
[58] Field of Search ..................... 528/199, 198, 196

[56] References Cited

U.S. PATENT DOCUMENTS

| | | | |
|---|---|---|---|
| 2,970,131 | 1/1961 | Moyer et al. | 528/198 |
| 3,227,681 | 1/1966 | Conix | 528/189 |
| 3,254,051 | 5/1966 | Schmitt | 528/199 |
| 3,326,958 | 6/1967 | Curtius et al. | 558/260 |
| 4,153,780 | 5/1979 | Narita et al. | 528/198 |
| 4,471,105 | 9/1984 | Campbell | 528/199 |
| 4,535,143 | 8/1985 | Price et al. | 528/174 |

OTHER PUBLICATIONS

Journal of Polymer Science: Part A: Polymer Chemistry, vol. 28, 3327–3335, (1990), Preparation and Characterization of Fluorine–Containing Aromatic Condensation Polymers, etc., Yasuo Saegusa et al.

Recent Progress in the Use of Phase–Transfer Catalysis for Polycondensation Reactions Application to the Preparation of Polyethers, Polycarbonates and Polyesters, O. Mahamat et al., (1987), pp. 191–206.

Eur. Polym. J., 1987, 23(2), pp. 110–112, L. H. Tagle and F. R. Diaz.

Eur. Polym. J., vol. 25, No. 6, pp. 549–551, (1989)—Polymerization by Phase Transfer Catalysis—9. Bisphenyl-A Copoly(carbonate-Thiocarbonate)s Synthesis, L. H. Tagle, F. R. Diaz and P. Salas.

Polymer Bulletin, 25, pp. 319–326, (1991)—Polymerization by Phase Transfer Catalysis—10. Polycarbonates and Polythiocarbonates from Diphenols with Chlorinated Aromatic Side Groups, L. H. Tagle, F. R. Diaz and C. Margozzini.

J. Macromol. Sci.-Chem., A28(3 & 4), pp. 397–411, (1991)—Polycarbonate Resins: Synthesis and Thermogravimetric Analysis, L. H. Tagle and F. R. Diaz.

Primary Examiner—John Kight, III
Assistant Examiner—Terressa Mosley
Attorney, Agent, or Firm—William A. Teoli; William H. Pittman

[57] ABSTRACT

A method is provided for making polycarbonate utilizing an effective amount of a phase transfer catalyst, such as tetrabutylammonium bromide as a condensation catalyst during the interfacial phosgenation of a bisphenol, such as bisphenol A. Improved phosgene utilization is achieved.

13 Claims, No Drawings

METHOD FOR MAKING AROMATIC POLYCARBONATES

This application is a continuation-in-part of application 08/066,382, filed May 24, 1993, now abandoned. Reference is also made to applications Ser. No. 08/066,380, now U.S. Pat. No. 5,300,623, and Ser. No. 08/066,381, now U.S. Pat. No. 5,300,624, filed concurrently with Ser. No. 08/066,382, now abandoned.

BACKGROUND OF THE INVENTION

The present invention relates to a method for making polycarbonate by phosgenating a bisphenol in the presence of a phase transfer catalyst (PTC). More particularly, the present invention relates to the employment of a PTC, such as a tetraalkylammonium or tetraalkyl phosphonium bromide as a condensation catalyst for the polymerization of bisphenol under interfacial reaction conditions.

As shown by Freitag et al, The Encylopedia of Polymer Science and Engineering, John Wiley & Sons, New York (1988), Second Edition, polycarbonates have been made by phosgenating bisphenols under interfacial reaction conditions using a tertiary organic amine, such as triethylamine as a condensation catalyst. Although tertiary organic amines having been found to be effective as bisphenol condensation catalysts, experience has shown that use of tertiary organic amines results in excess phosgene usage. Efforts have been made therefore to develop procedures to minimize excessive phosgene losses. For example, a reactor with an overhead condenser can be used to trap phosgene, as shown by Silva, U.S. Pat. No. 4,701,544, or the rate of heat generated during the course of bisphenol condensation can be monitored, as shown by Brunelle et al, U.S. Pat. No. 4,814,420.

Although tertiary organic amines have been found to be highly effective as condensation catalysts for building polycarbonate molecular weight during phosgenation, experience has shown that tertiary organic amines often lead to excessive phosgene usage as a result of phosgene hydrolysis, and/or chloroformate hydrolysis prior to the termination of capping. For example, in a phosgene hydrolysis rate study, it was found that at a triethylamine concentration of $6.64 \times 10^{-3}$ M, triethylamine effected phosgene hydrolysis at a relative rate of greater than 200 compared to a reference value of 1 without catalyst. With respect to rate of chloroformate hydrolysis, where a relative value of less than 0.01 has been found for a catalyst-free system, triethylamine shows a value of greater than 100.

In Campbell et al, U.S. Pat. No. 4,471,105, an interfacial polycarbonate poly condensation process is shown for making sterically hindered polycarbonate utilizing a quaternary phosphonium amino halide catalyst. Additional investigations with respect to phase transfer catalyst usage, such as the synthesis of copoly(carbonatethiocarbonate)s from bisphenols and a mixture of phosgene and thiophosgene are shown by Tagle et al, European Polymer Journal 1987, 23(2), 109–112, and European Polymer Journal 1989, 25(6), 549–551.

Various condensation catalysts are constantly being evaluated to determine their effectiveness for polymerizing various types of polymers. Considerable effort is being maintained to determine the effectiveness of such condensation catalysts as replacement condensation catalysts for tertiary organic amines in conventional polycarbonate synthesis.

SUMMARY OF THE INVENTION

The present invention is based on the discovery that a phase transfer catalyst, "PTC" selected from the class consisting of,

   (1)

   (2)

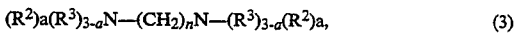   (3)

where R is selected from the same or different $C_{(3-10)}$ alkyl group, $R^1$ is a $C_{(1-3)}$ alkyl group, $R^2$ is selected from the same or different $C_{(1-2)}$ alkyl group, $R^3$ is selected from the same or different $C_{(3-10)}$ alkyl group, Q is a nitrogen or phosphorus atom, X can be a halogen atom, or an $-OR^4$ group, $R^4$ is a member selected from H, $C_{(1-18)}$ alkyl or $C_{(6-18)}$ aryl, and "a" is a whole number equal to 0 to 1, has been found to be effective as a bisphenol condensation catalyst under interfacial reaction conditions between bisphenols, or oligomeric phenols, and chloroformate terminated bisphenols, or chloroformate terminated polycarbonate oligomers. As a result, the PTC's of the present invention can be used to make aromatic polycarbonates and polycarbonate copolymers, such as shown in U.S. Pat. Nos. 3,635,895 and 4,001,184. These aromatic polycarbonates which can be made using the phase transfer catalyst of the present invention include high molecular weight thermoplastic randomly branched materials. Some of the polyfunctional compounds which can be employed in making the branched polymers are generally aromatic and contain at least three functional groups, such as phenoxy, carboxyl, carboxylic anhydride, haloformyl or mixtures thereof. Additional polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid and benzophenonetetracarboxylic anhydride. The preferred polyfunctional aromatic compounds useful in making high molecular weight thermoplastic randomly branched polycarbonates are 1, 1, 1-tris-(4-hydroxyphenyl)ethane, 4-[4-[1, 1-bis(4-hydroxyphenyl)-ethyl]-dimethylbenzyl]phenol, 1, 1, 1-tris (4-hydroxyphenyl)ethane, trimellitic anhydride or trimellitic acid or their haloformyl derivatives.

An example for copolymer formation is the preparation of copolyester carbonates from dicarboxylic acids. These copolymer compositions are set forth in U.S. Pat. Nos. 4,506,065, 4,465,820, and 4,156,069. Although any aromatic dicarboxylic acid can be used, the preferred dicarboxylic acids are terephthalic acids and isophthalic acids and mixtures thereof. Alternatively, derivatives of such acids, such as the acid halides, for example the acid dichlorides and acid dibromides for such aromatic dicarboxylic acids, for example, terephthaloyl dichloride, mixtures with isophthaloyl dichloride can also be used. High flow ductile copolyester carbonates using aliphatic dicarboxylic acids also can be prepared. The preferred aliphatic dicarboxylic acids are azelaic acid, suberic acid, 1,10-decanedicarboxylic acid and 1,12-dodecanedicarboxylic acid. In addition, polycarbonatesiloxane block copolymers also can be made by utilizing the phase transfer catalyst of the present invention in the reaction between a bisphenol and a phenolic terminated polydiorganosiloxane, such as a eugenol terminated polydimethylsiloxane.

In addition, it has been found that the relative rate of phosgene hydrolysis, or chloroformate hydrolysis for the PTC of formulas (1), (2) or (3) at a molar concentration of $6.64 \times 10^{-3}$, is considerably less than triethylamine. For example, as compared to values greater than 200 and 100 respectively for triethylamine as a phosgene or chloroformate hydrolysis catalyst at molar concentrations of $6.64 \times 10^{-3}$, a phase transfer catalyst within formula (1) or (2) have been found to have relative rate values of 1.7 to 3.5 for phosgene and about 1 for chloroformate.

STATEMENT OF THE INVENTION

There is provided by the present invention, a method for making polycarbonate, comprising, (A) effecting reaction under interfacial reaction conditions at a pH in the range of 9 to 12.5 between a phenolic chain-stopper and a bisphenol of the formula,

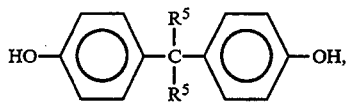
(4)

where $R^5$ is selected from the same or different $C_{(1-4)}$ alkyl group, and a substantially stoichiometric amount of phosgene in the presence of an amount of phase transfer catalyst of formulas (1), (2) or (3) which is effective for providing polycarbonate having a GPC molecular weight in the range of about 25K to about 180K compared, and (B) substantialy eliminating chloroformate end groups in the resulting mixture of (A) prior to polycarbonate recovery.

Some of the bisphenols which are included within the formula (4) are, for example,
2,2-bis (4-hydroxy phenyl)propane (bisphenol A)
2,2-bis (4-hydroxy phenyl)butane (bisphenol B)
4,4-bis (hydroxy phenyl)heptane
2,2-bis (hydroxy phenyl)hexane
2,2-bis (4-hydroxy phenyl)pentane
2,2-bis (4-hydroxy phenyl)-4-methyl pentane
2,2-bis (4-hydroxy phenyl)heptane, and
3,3-bis (4-hydroxy phenyl)2,4-dimethyl pentane.

Some of the phase transfer catalysts which are included within formula (1) are for example,

[CH$_3$(CH$_2$)$_3$]$_4$NX

[CH$_3$(CH$_2$)$_5$]$_4$NX

[CH$_3$(CH$_2$)$_6$]$_4$NX, and

CH$_3$[CH$_3$(CH$_2$)$_3$]$_3$NX, where X is selected from Ci$^-$, Br$^-$ or $-$OR$^4$, or where R$^4$ is as previously defined.

In addition to the phase transfer catalysts of formula (1), there are included within formulas (2) and (3), phase transfer catalysts having the formulas,

CH$_3$ (C$_4$ H$_9$)$_3$NX,

CH$_3$ (C$_4$ H$_9$)$_3$PX,

C$_2$H$_5$(C$_6$H$_{13}$)$_3$NX, (C$_4$H$_9$)$_3$N—(CH$_2$)$_6$—N(C$_4$H$_9$)$_3$, (C$_3$H$_7$)$_3$N—(CH$_2$)$_6$—N(C$_3$H$_7$)$_3$, and

CH$_3$(C$_5$H$_{11}$)$_2$N—(CH$_2$)$_4$—N(C$_5$H$_{11}$)$_2$CH$_3$, where X is as previously defined.

In the practice of one form of the present invention, a mixture of bisphenol and a phenolic chain-stopper is phosgenated under interfacial reaction conditions in the presence of an organic solvent, in the presence of an effective amount of a phase transfer catalyst included within formula (1), (2) or (3). Suitable organic solvents which can be used are, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

An effective amount of phase transfer catalyst is from 0.05 to 10% by weight and preferably from 0.1 to 1% by weight, based on the weight of bisphenol and phenolic chain-stopper charged to the mixture.

Sufficient alkali metal hydroxide can be utilized to raise the pH of the bisphenol reaction mixture to 10.5 prior to phosgenation to provide dissolution of some of the bisphenol and chain-stopper into the aqueous phase.

Aqueous alkali, or alkaline earth metal hydroxide can be used to maintain the pH of the phosgenation mixture which can be in the range of between about 9 to about 12.5 and preferably 10 to 12. Some of the alkali metal or alkaline earth metal hydroxides, which can be employed are for example, sodium hydroxide, potassium hydroxide, and calcium hydroxide. Sodium and potassium hydroxides, and particularly sodium hydroxide is preferred. The concentration of the alkali hydroxide solution which is utilized is not critical and can be between about 0.2–19 M. Aqueous metal hydroxide alkali concentrations of at least 5M are preferred.

In instances where a substantially stoichiometric amount of phosgene is used, experience has shown that from about 0 to about 50 ppm of a trialkyl amine, such as triethyl amine or tributyl amine can be tolerated in the reaction mixture without adversely affecting phosgene utilization.

Phosgenation of the bisphenol can be conducted in a wide variety of either batch or continuous reactors. Such reactors are, for example, stirred tank reactors, which may be either batch or continuous flow. Additional reactors which are included are agitated column and recirculating loop continuous reactors.

The volume ratio of aqueous to organic phase during and at the termination of the phosgenation reaction can be in the range of about 0.2–1:1. Reaction temperatures can-be in the range of between about 15°–50° C. When the preferred organic liquid is utilized, such as methylene chloride, the reaction may be conducted at reflux which can be 35°–42° C. The reaction can be conducted at atmospheric pressures, although sub- or superatmospheric pressures may be employed if desired.

During phosgenation, the mixture is agitated, such as, by using a stirrer or other conventional equipment. The phosgenation rate can vary from between about 0.02–0.2 mol of phosgene, per mol of bisphenol per minute.

Depending upon the molecular weight of polycarbonate desired, phenolic chain-stoppers can be used in a proportion of from 1 to 8 mole % based on the total moles of bisphenol and phenolic chain-stopper. Some of the phenolic chain-stoppers are, phenol, t-butyl phenol, p-cumyl phenol and chloroformates of these phenols.

Prior to polycarbonate recovery which can be achieved by standard techniques, such as filtration, decantation, and centrifugation, chloroformate end groups are substantially eliminated. One procedure which can be used is by agitation of the mixture until the presence of chloroformates cannot be detected. The detection procedure of Agree et al can be used employing 4-(4-nitrobenzyl)pyridine (NBP) as shown in Talanta, 1966, 13, 1151–1160. Spotting of commercially available phosgene detection paper, such as Chemcassette SP from MDA Scientific of Lincolnshire, Ill., with a portion of the reaction mixture also can be employed.

Another chloroformate removal method is by adding low levels, such as 100–1000 ppm of a tertiary alkyl amine, such as triethylamine, followed by the use of additional phosgene to react with phenolic hydroxy. A third procedure is the addition of an equivalent level of phenolic hydroxy, such as bisphenol, chain-stopper or mixture based on the level of chloroformate detected by independent analytical techniques, such as a spectral technique or an indicator, such as NBP.

In order that those skilled in the art will be better able to practice the present invention, the following examples are given by way of illustration and not by way of limitation. All parts are by weight unless otherwise indicated.

EXAMPLE 1

Phosgene was introduced into a bisphenol phosgenation mixture at a rate of 0.75 g/min, (7.6 mmol/min) for 13.5 min (102 mmol). The mixture consisted of 22.9 g of bisphenol A (100 mmol), 0.376 g of phenol (4.0 mmol), 637 µL of a 40 weight % solution of tetrabutylammonium hydroxide (1.0 mmol) 200 ml of methylene chloride, and 100 ml of water. During the phosgenation, the mixture was maintained at a pH of 10.5–11 by dropwise addition of a 50 weight % aqueous sodium hydroxide solution. Upon completion of the phosgenation, chloroformates were detected by use of phosgene detection paper or by employing 4-(4-nitrobenzo)pyridine (NBP) as described by A. N. Agree et al previously cited. The chloroformate end groups were eliminated by stirring the mixture for 50 minutes at a pH of 11. Concentrated aqueous HCL was added until the pH was lowered to about 8. The brine was separated from the organic phase and the organic phase was washed with aqueous HCl and several times with water. The polycarbonate was obtained which had a molecular weight of 41.5K as determined by GPC analysis.

The above procedure was repeated except that instead of stirring the mixture for 50 minutes at pH 11, 18 µL of triethylamine (0.129 mmol) was added to the mixture. It was found that the chloroformate disappeared within 15 minutes. However, the molecular weight of the polycarbonate was only 39.5 K. Addition of 0.4 g of phosgene produced no detectable chloroformates employing the phosgene detection paper as previously described, and the molecular weight of the polycarbonate was found to increase to 41.5 K.

EXAMPLE 2

The procedure of example 1 was repeated except that 114 g (0.500 moles) of bisphenol A, 4.246 g of cumyl phenol (0.400 moles), 800 ml of methylene chloride, 200 ml of water and 2.28 ml of a 40% tetrabutylammonium hydroxide was used. While maintaining the pH at 10.8, phosgene was added to the mixture at the rate of 3.00 g/min. As a result, 50.94 g of phosgene (0.515 moles) was delivered to the reaction. The amount of phosgene employed corresponded to a 1.0 % excess of phosgene based on bisphenol A and the cumyl phenol chain-stopper. The nitrobenzylpyridine detection method indicated a chloroformate concentration of $1390 \times 10^6$ molar. Upon addition of 0.150 g of bisphenol A to the reaction mixture, the chloroformates were found to have been completely consumed within 4 minutes. A polycarbonate was recovered having a molecular weight of 41.4 K.

The above procedure is repeated, except that 1.0 g of bis(tributylamino)hexamethylene is used. A polycarbonate is recovered having substantially the same molecular weight as shown above.

The above procedure is repeated again except that 0.86 g of bis(tripropylamino)hexamethylene is substituted for the bis(tributylamino)hexamethylene. The reaction proceeds in the same manner and a polycarbonate having a similar molecular weight is obtained.

Although the above examples are directed to only a few of the very many variables which can be employed in the practice of the method of the present invention, it should be understood that the present invention is directed to preparation of a much broader variety of polycarbonates utilizing the bisphenols, phase transfer catalyst and chain-stoppers shown in the description preceding these examples.

What is claimed is:

1. A method for making polycarbonate, comprising,
(A) phosgenating under interfacial reaction conditions at a pH in the range of 9 to 12.5, a phenolic chain-stopper and a bisphenol of the formula,

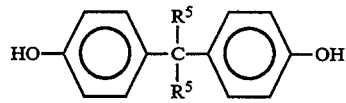

in the presence of 0.05 to 10% by weight of a polyalkylammonium or polyalkylphosphonium phase transfer catalyst selected from the class consisting of $(R)_4N^+X$, $R^1(R)_3Q^+X$, and $(R^2)_a(R^3)_{3-a}N—(CH_2)_nN—(R^3)_{3-a}(R^2)_a$, to provide a polycarbonate having a gel phase chromatographic molecular weight in the range of about $25 \times 10^3$ to about $180 \times 10^3$, and, (B) eliminating chloroformate end groups in the resulting mixture of (A) prior to polycarbonate recovery, where R is selected from the same or different $C_{(3-10)}$ alkyl group, $R^1$ is a $C_{(1-3)}$ alkyl group, $R^2$ is selected from the same or different $C_{(1-2)}$ alkyl group, $R^3$ is selected from the same or different $C_{(3-10)}$ alkyl group, Q is a nitrogen or phosphorus atom, X is selected from a halogen atom, or an —$OR^4$ group, $R^4$ is a member selected from H, $C_{(1-18)}$ alkyl or $C_{(6-18)}$ aryl, $R^5$ is selected from the same or different $C_{(1-4)}$ alkyl group, and "a" is a whole number equal to 0 or 1.

2. A method in accordance with claim 1, where the bisphenol is bisphenol A.

3. A method in accordance with claim 1, where the phase transfer catalyst is tetrabutylammonium hydroxide.

4. A method in accordance with claim 1, where the phase transfer catalyst is methyltributylphosphonium bromide.

5. A method in accordance with claim 1, where the phase transfer catalyst is methyltributylammonium bromide or tetrabutylammonium chloride.

6. A method in accordance with claim 1, where the phase transfer catalyst is bis (tributylamino) hexamethylene 7. A method in accordance with claim 1, where the phase transfer catalyst is bis(tripropylamino)hexamethylene.

8. A method in accordance with claim 1, where HCL is added to lower the pH after the elimination of chloroformate end groups and prior to polycarbonate recovery in step (B).

9. A method in accordance with claim 1, where the phenolic chain-stopper is phenol.

10. A method in accordance with claim 1, where the phenolic chain-stopper is cumyl phenol.

11. A method in accordance with claim 1, where the chloroformate end groups are eliminated by addition of an aromatic phenol compound.

12. A method in accordance with claim 1, where the phase transfer catalyst is methyltributylammonium chloride.

13. A method in accordance with claim 1, where the chloroformate end groups are eliminated by addition 100 ppm to 1000 ppm of triethylamine followed by the addition of sufficient phosgene to react with any residual phenolic hydroxy.

* * * * *